United States Patent
Milliren et al.

(10) Patent No.: US 7,341,776 B1
(45) Date of Patent: Mar. 11, 2008

(54) PROTECTIVE FOAM WITH SKIN

(76) Inventors: Charles M. Milliren, 12589 Harold Dr., Chesterland, OH (US) 44026; Hayden L. Leon, III, 4233 Oaksbury La., Rolling Meadows, IL (US) 60008; Jason R. Brand, 2157 Stumpville Rd., Jefferson, OH (US) 44047; Randy Bryan Collins, 34450 Lewis St., North Ridgeville, OH (US) 44039; R. Craig Virnelson, 8696 Ranch Dr., Chesterland, OH (US) 44026

( * ) Notice: Subject to any disclaimer, the term of this patent is extended or adjusted under 35 U.S.C. 154(b) by 0 days.

(21) Appl. No.: 10/672,247

(22) Filed: Sep. 26, 2003
(Under 37 CFR 1.47)

Related U.S. Application Data

(60) Provisional application No. 60/415,845, filed on Oct. 3, 2002.

(51) Int. Cl.
*B32B 27/08* (2006.01)
*A42B 3/12* (2006.01)

(52) U.S. Cl. .................... 428/319.3; 428/71; 428/131; 428/319.7; 428/318.8; 2/411; 2/412; 2/414; 2/455

(58) Field of Classification Search .................. 428/71, 428/131, 318.8, 319.3, 319.7; 2/411–414, 2/455
See application file for complete search history.

(56) References Cited

U.S. PATENT DOCUMENTS

| | | | |
|---|---|---|---|
| 3,366,971 A | 2/1968 | Scherz | |
| 3,500,472 A | 3/1970 | Castellani | |
| 3,507,727 A | 4/1970 | Marshack | |
| 3,844,862 A | 10/1974 | Sauer et al. | |

(Continued)

FOREIGN PATENT DOCUMENTS

FR 2717659 A1 * 9/1995

(Continued)

OTHER PUBLICATIONS

The article "Information on Flexible Polyurethane foam," Jun. 2003, 7 pages.*

(Continued)

*Primary Examiner*—Hai Vo
(74) *Attorney, Agent, or Firm*—Pearne & Gordon LLP

(57) ABSTRACT

A protective foam layer is provided. The protective layer has a foam substrate that is at least partially enclosed by a formed skin adjacent the outer surface of the foam substrate. The formed skin is substantially non-porous. The combination of the foam substrate with the formed skin results in a protective layer that is effective to absorb and/or dissipate impact force for both high- and low-speed impacts that can be experienced during a sporting event such as cycling. The formed skin can also be provided with a plurality of protective zones having vent holes through the formed skin to regulate the degree of energy absorption in the respective zones. In this manner, a single continuous protective foam layer can be provided having multiple protective zones having distinct energy absorption characteristics instead of providing discrete protective layers that must be joined or meet at a seam. According to the invention, by providing such a continuous protective layer with no such seams, a known failure mode in protective equipment is eliminated.

21 Claims, 2 Drawing Sheets

U.S. PATENT DOCUMENTS

| | | | |
|---|---|---|---|
| 3,994,020 A | 11/1976 | Villari | |
| 4,029,534 A | 6/1977 | Bocks et al. | |
| 4,044,399 A | 8/1977 | Morton | |
| 4,075,717 A | 2/1978 | Lemelson | |
| 4,101,983 A * | 7/1978 | Dera et al. | 2/412 |
| 4,114,197 A | 9/1978 | Morton | |
| 4,279,038 A | 7/1981 | Bruckner et al. | |
| 4,338,371 A | 7/1982 | Dawn et al. | |
| 4,345,338 A | 8/1982 | Frieder, Jr. et al. | |
| 4,513,449 A * | 4/1985 | Donzis | 2/462 |
| 4,558,470 A | 12/1985 | Mitchell et al. | |
| 4,566,137 A | 1/1986 | Gooding | |
| 4,627,114 A | 12/1986 | Mitchell | |
| 4,695,496 A | 9/1987 | Lee | |
| 4,700,403 A | 10/1987 | Vacanti | |
| 4,808,469 A | 2/1989 | Hiles | |
| 4,845,786 A | 7/1989 | Chiarella | |
| 4,872,220 A | 10/1989 | Haruvy et al. | |
| 4,916,759 A | 4/1990 | Arai | |
| D310,893 S | 9/1990 | Broersma | |
| 5,014,691 A | 5/1991 | Cueman et al. | |
| 5,025,504 A | 6/1991 | Benston et al. | |
| 5,027,803 A | 7/1991 | Scholz et al. | |
| 5,056,162 A | 10/1991 | Tirums | |
| 5,083,361 A | 1/1992 | Rudy | |
| 5,271,103 A | 12/1993 | Darnell | |
| 5,274,846 A | 1/1994 | Kolsky | |
| 5,324,460 A | 6/1994 | Briggs | |
| 5,330,249 A | 7/1994 | Weber et al. | |
| 5,376,318 A | 12/1994 | Ho | |
| 5,421,035 A | 6/1995 | Klose | |
| 5,423,087 A | 6/1995 | Krent et al. | |
| 5,439,733 A | 8/1995 | Paire | |
| 5,581,818 A | 12/1996 | Lorenzi et al. | |
| 5,598,588 A | 2/1997 | Lee | |
| 5,655,226 A | 8/1997 | Williams | |
| 5,669,079 A | 9/1997 | Morgan | |
| 5,734,994 A | 4/1998 | Rogers | |
| 5,741,568 A | 4/1998 | Rudy | |
| 5,891,372 A | 4/1999 | Besset et al. | |
| 5,913,412 A | 6/1999 | Huber et al. | |
| 5,946,734 A | 9/1999 | Vogan | |
| 5,950,244 A | 9/1999 | Fournier et al. | |
| 6,051,624 A * | 4/2000 | Bastin et al. | 521/174 |
| 6,070,271 A | 6/2000 | Williams | |
| 6,105,162 A | 8/2000 | Douglas et al. | |
| 6,105,176 A | 8/2000 | Egger | |
| 6,108,825 A | 8/2000 | Bell et al. | |
| 6,154,889 A | 12/2000 | Moore, III et al. | |
| 6,326,077 B1 | 12/2001 | Monaci | |
| 6,351,854 B1 | 3/2002 | Whalen et al. | |
| 6,381,759 B1 | 5/2002 | Katz | |
| 6,391,935 B1 * | 5/2002 | Hager et al. | 521/170 |
| 6,425,141 B1 * | 7/2002 | Ewing et al. | 2/412 |
| 6,434,755 B1 | 8/2002 | Halstead et al. | |
| 6,446,270 B1 | 9/2002 | Durr | |
| 6,453,476 B1 | 9/2002 | Moore, III | |
| 6,467,099 B2 | 10/2002 | Dennis et al. | |
| 6,604,246 B1 | 8/2003 | Obreja | |
| 6,634,045 B1 * | 10/2003 | DuDonis et al. | 5/648 |
| 6,658,671 B1 | 12/2003 | Von Holst et al. | |
| 2002/0152542 A1 | 10/2002 | Dennis et al. | |
| 2002/0168496 A1 * | 11/2002 | Morimoto et al. | |

FOREIGN PATENT DOCUMENTS

| | | |
|---|---|---|
| SU | 659134 | 4/1979 |
| WO | WO 9105489 A1 * | 5/1991 |

OTHER PUBLICATIONS

The article "Specialty Foams and Composites", 1 page.*
English Abstract of FR 2 717 659, Nieddu Pietro, Sep. 1995.*
Google translation of Doc. No. FR2717659.

* cited by examiner

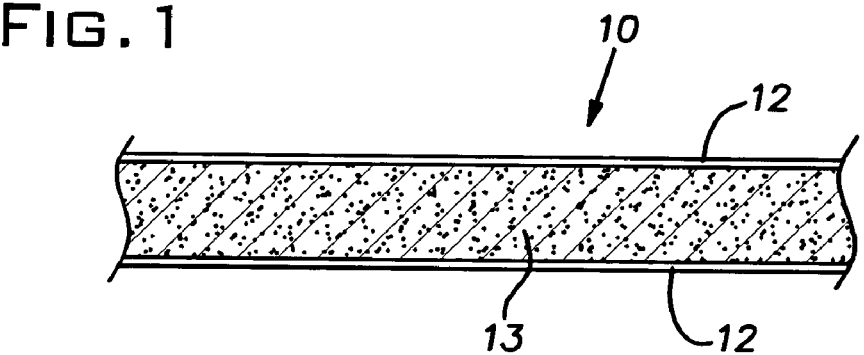
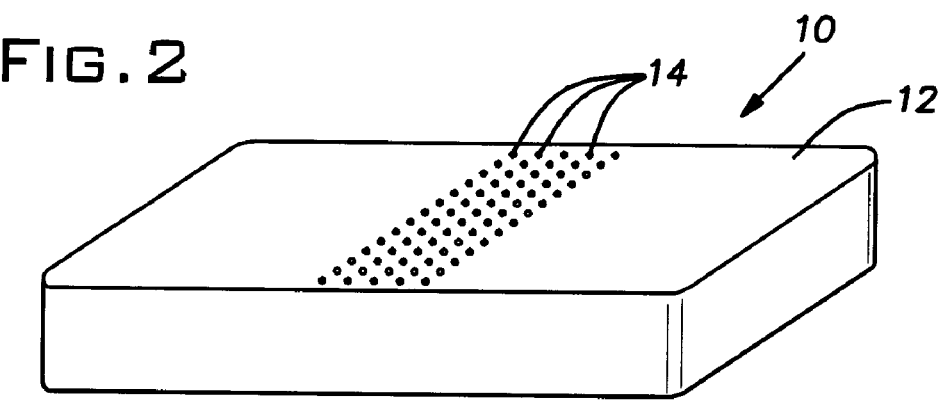
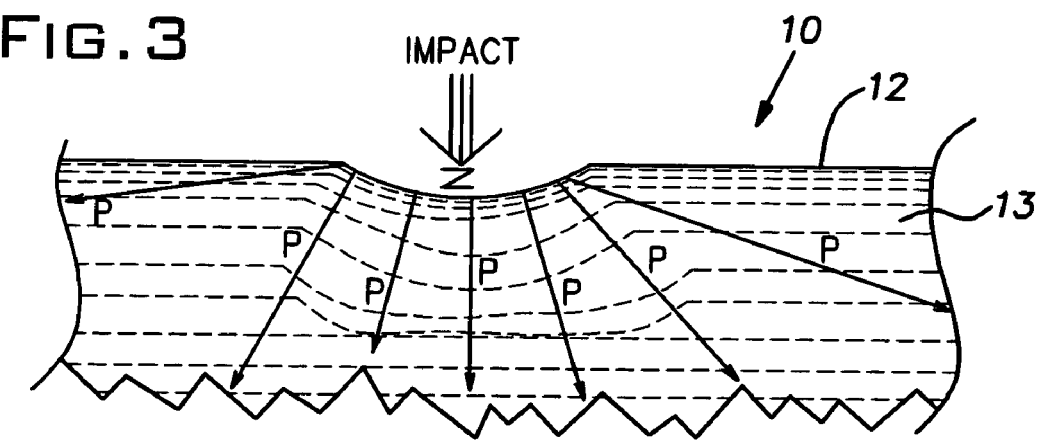

PROTECTIVE FOAM WITH SKIN

This application claims the benefit of U.S. Provisional Patent Application Ser. No. 60/415,845 filed on Oct. 3, 2002.

BACKGROUND OF THE INVENTION

Polymeric protective foams (e.g. protective foam layers) are widely used for impact force attenuation in sports- and other safety-equipment. In general, a protective foam layer is placed adjacent or against a part of a person's body to protect that body part (e.g. the head) during an impact with, for example, the ground or even another person's head.

Protective foams function by absorbing and/or dissipating the impact energy from the force of an impact. An energy absorbing foam deforms or crushes upon impact thereby consuming a portion of the impact energy so that portion does not reach the underlying body part. An energy dissipating foam spreads the impact force over a larger surface area than the actual area of impact so that the force per unit area is decreased for the underlying body part compared to that for the initial impact surface (e.g. the outer surface of the protective layer or a hard outer shell over the protective layer).

All rigid or semi-rigid protective foams are energy dissipating foams to some extent because, due to their rigidity, they do not instantaneously yield upon impact. Instantaneous yielding would result in the transmission of the entire impact force to the localized region of the underlying body part immediately beneath the protective layer at the point of impact. Instead, rigid and semi-rigid foam layers typically retain sufficient rigidity during impact to transmit at least a portion of the impact energy from the point source (impact site) to lateral or adjacent regions of the foam layer before the energy is transmitted to the underlying body part. The result is to spread the impact force over a larger area and thereby reduce the force per unit area experienced by the underlying body part as described above.

However, conventional rigid and semi-rigid foams do not exhibit satisfactory energy absorption for many impacts, particularly for impacts at lower speeds, e.g. below 5 mph. For example, expanded polystyrene (EPS) is a rigid polymeric foam often employed as the protective foam layer in bicycle helmets. EPS is a rigid, non-resilient foam that may absorb impact energy by deforming or crushing during high speed impacts. This may prevent serious brain injury or even death in high speed bicycle accidents.

But, EPS is totally ineffective at absorbing the impact energy of low speed impacts (e.g. impact speeds lower than 5 miles per hour) where greater than 80% of all bicycling head impacts occur. This is because EPS is so rigid that it yields or crushes only slightly, if at all, at these low speeds. As a result, a rigid EPS protective layer as known in the art actually transmits most or all of the impact energy from low speed impacts directly to the underlying body part, typically the head.

There is a need in the art for a protective foam layer that provides effective impact energy absorption as well as dissipation at lower impact speeds, while still providing effective protection for high speed impacts. Preferably, such a protective foam layer will provide effective impact energy attenuation (both absorption and dissipation) across a range of impact speeds, from slow (e.g. less than 5 or 10 mph) to fast (e.g. greater than 15, 20 or 25 mph).

SUMMARY OF THE INVENTION

A protective layer is provided that has a foam substrate and a formed skin that at least partially encloses the foam substrate.

BRIEF DESCRIPTION OF THE DRAWINGS

FIG. 1 shows a cross-section of a protective foam layer having a formed skin according to the invention.

FIG. 2 shows a perspective view of the protective foam layer of FIG. 1, wherein vent holes according to the invention are provided.

FIG. 3 is a schematic cross-sectional view of the protective foam layer of FIG. 1, showing the mechanism of impact attenuation.

DETAILED DESCRIPTION OF THE PREFERRED EMBODIMENTS OF THE INVENTION

Figure 4:
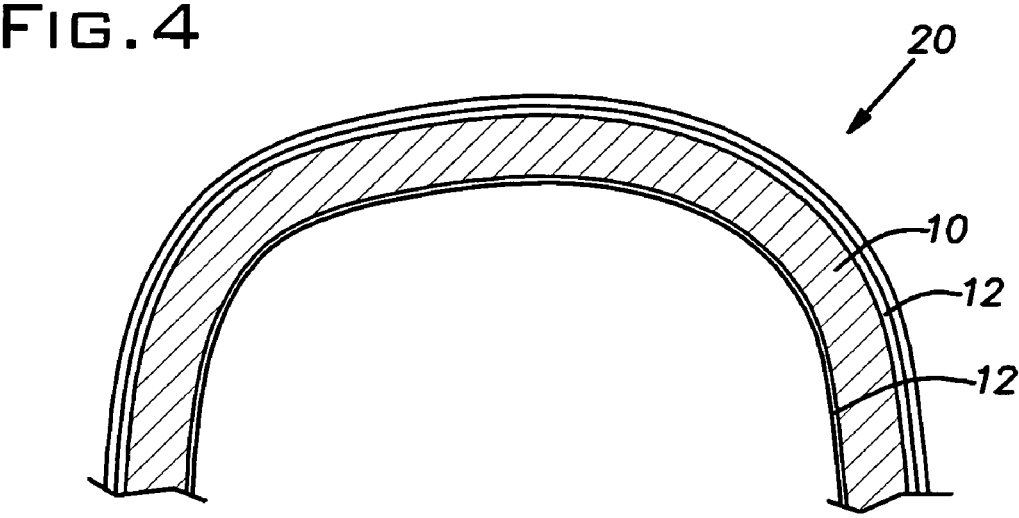
FIG. 4 shows a cross-section of a helmet 20 that has been provided with a protective layer 10 having a formed skin 12 according to the invention.

As used herein, whenever a range is given, such as 5 to 25 (or 5-25), this means preferably at least 5, and separately and independently, preferably not more than 25.

As used herein, the term formed skin refers to a thin layer of polymeric material that covers or encloses at least a portion of the underlying protective foam substrate. The formed skin can be a separate material layer that is prepared apart from and then subsequently formed or melted to the foam substrate. Alternatively, the formed skin can be formed from the outer surface of the foam substrate itself. By "formed" it is meant that the formed skin is bonded to the outer surface of the foam substrate either by forming integrally therewith, or otherwise by being formed thereto such as by melting followed by fusion of the skin to the foam substrate in the molten state so that when the skin cools it has melded or formed to the underlying foam substrate. The term "formed" excludes bonding via adhesives.

Referring to FIG. 1, an impact absorbing protective layer 10 is provided having a formed skin 12 that at least partially encloses an absorbent foam substrate 13. The formed skin 12 preferably is a thin film made from a formable thermoplastic, e.g. polyurethane. The foam substrate 13 is preferably made from flexible foam, preferably flexible polyurethane, and has a glass transition temperature less than 50° C., and preferably in the range of ambient temperature such as 0-40° C., 0-30° C., 0-25° C., 5-25° C., 10-25° C., or 15-25° C. In one embodiment, the particular flexible foam for the foam substrate 13 is selected to have a glass transition temperature that is substantially proximate to (i.e. +/−5, 10 or 15 degrees Celsius of) the average ambient temperature for the environment where the protective layer 10 will be used. Foaming compositions can be selected by a person of ordinary skill in the art to provide a resulting foam substrate having a suitable glass transition temperature as described above, and in this manner the glass transition temperature can be "tuned" for the intended temperature conditions. For example, according to the invention the foam substrate 13 for use in skiing equipment has a glass transition temperature of ⁻25-10° C., ⁻10-5° C., or ⁻5-2° C., whereas, a foam substrate for use in cycling has a glass transition temperature of 5-40° C., 10-35° C., or 15-30° C.

In a preferred embodiment, the foam substrate 13 is made from a recoverable or resilient open cell foam, preferably flexible or semi-rigid polyurethane, that is at least partially enclosed by the formed skin 12. By "resilient", it is meant that the open cell foam is ordinarily (i.e. when not enclosed by skin 12) capable of reversible, non-destructive deformation as a result of an impact, and will recover to a substantial proportion of its initial volume (with little or negligible damage to the cellular structure) once the impact force is removed. The formed skin 12 preferably has a thickness of 0.05-2 mm, preferably 0.5-1 mm. Except for the vent holes 14 described below, the formed skin is substantially non-porous, having a porosity at least 10, preferably 20, preferably 30, preferably 40, preferably 50, preferably 60, preferably 70, preferably 80, percent lower than the outer surface of the underlying foam substrate that is ensheathed by the formed skin. The thickness of the foam substrate 13 can vary based on factors such as the anticipated range of impact forces and the impact force sensitivity of the underlying body part to be protected. The thickness of the foam substrate 13 can be, for example, 0.2-4, 0.4-3, 0.5-2, or 1-2, inches thick, alternatively some other suitable thickness.

The foam substrate can be made using conventional foam molding techniques. In one preferred embodiment, the formed skin 12 is provided as a thin film on the outer surface of the foam substrate by 1) vacuum forming highly elastic thermoplastic polyurethane onto a mold surface that is to be used to mold the foam substrate; and 2) providing the mixed foam precursors (e.g. liquid polyurethane precursor including isocyanate reactive component, blowing agent and isocyanate) into the film-coated mold and curing to provide the protective layer with the foam substrate formed to the skin 12.

By preparing the protective layer in this manner, it is contemplated to be unnecessary to use a mold release agent to demold the foam substrate because the film (skin 12) exhibits release properties. This could eliminate downtime for cleaning and surface preparation of the mold.

The formed skin 12 can be provided with a plurality of strategically placed vent holes 14 (as shown in FIG. 2) therein. The vent holes 14 provide fluid communication between the ambient environment and the exterior-most region (outer surface) of the ensheathed foam substrate 13. The vent holes 14 are arranged in the formed skin 12 to provide regions or zones of greater or lesser rigidity to the foam substrate 13 as further described below. First, the mechanism by which an impact to the protective layer 10 occurs, and is absorbed or dissipated by the layer 10, must be described.

Referring to FIG. 3, an impact occurs at impact zone Z on the formed skin 12. Because the foam substrate 13 is open cell foam having a network of open cells, at the moment of impact gas (air) in the cells immediately adjacent the impact zone Z is compressed and pumped into neighboring cells due to the resulting pressure gradient. The initial result is that the cells adjacent the impact zone experience a decrease in volume as the air therein is compressed and transferred to adjacent cells. The physical behavior of the cells within the cellular network of substrate 13 during an impact is represented by the broken contour lines in FIG. 3, which will aid in understanding the cellular cascade described below. As gas is pumped into neighboring subjacent cells from the impact zone Z, the increased pressure in these subjacent cells induces a further pressure gradient decreasing in the direction of still further subjacent cells such that gas is compressed and forced into these further subjacent cells more distant from the impact zone and so on.

The resulting cellular cascade (compression of cells proximate to the impact zone, and relief of that pressure by compressing still more distal cells, successively further subjacent from the impact zone) produces a net pressure wave P (shown with arrows in FIG. 3) that propagates outward from the impact zone Z. The pressure wave P continues outward in all directions from the impact zone Z until the boundary of the substrate 13 is reached. Without the formed skin 12, once this pressure wave P reaches the boundary of the foam substrate, compressed gas would exit into the ambient atmosphere thus extinguishing the pressure wave P, and the substrate 13 (if made of flexible foam) would be crushed instantly on impact before resuming its original shape. This is why conventional open cell flexible and semi-rigid foams have been disfavored for protective foam layers; they provide little if any impact energy absorption when used alone.

However, when combined with the formed skin 12 open cell flexible and semi-rigid foams can provide substantial impact energy absorption. The formed skin 12 creates a barrier to pressure equalization with the ambient atmosphere such that the pressure wave P is retained within substrate 13 (and therefore protective layer 10) and turned back on reaching the formed skin 12 at the boundary of the substrate 13. The pressure wave P rebounds internally within the substrate 13 on reaching the skin 12 and continues to propagate internally until a pressure equilibrium is reached among all of the open cells therein; i.e. until all of the cells reach the same pressure. The result is an open cell flexible foam that functions essentially like a closed cell semi-rigid foam when subjected to an impact. The foam both absorbs a portion of the impact energy (through the internal deformations of the open cells from the cellular cascade due to the rebounding pressure wave P), and dissipates a portion of the impact energy by retaining substantial rigidity as a result of being prevented from exhausting gas pressure, and is effective to transfer the impact force throughout the internal cellular network of the foam substrate 13. The invented protective layer 10 with formed skin 12 provides effective low-speed impact energy attenuation because it does not remain perfectly rigid like EPS during low-speed impacts (e.g. less than 5 or 10 mph), and is effective to absorb low-speed impact energy by non-destructive, recoverable deformation of the foam substrate 13 resulting from the above-described cellular cascade.

On the other hand, the invented protective layer 10 with formed skin 12 also provides adequate protection during high-speed impacts, effective to absorb and/or dissipate high-speed (greater than 15, 20 or 25 mph) impact energy via destructive deformation of the foam substrate 13, similar to conventional rigid foams such as EPS except that the flexible or semi-rigid foams used in the present invention may still recover their original shape. Without wishing to be bound to a particular theory, it is believed the invented foam layer provides this protection for one or more of the following reasons. During low-speed impacts as described above, the resulting pressure wave P propagates relatively slowly, resulting in a relatively slow cellular cascade. As the cascade proceeds, the foam substrate 13 is reversibly compressed or deformed behind the cascade, and cushions the underlying body part during impact by absorbing a portion of the impact energy according to the mechanisms described above (e.g. recoverable internal cellular deformations). However, during a high-speed impact, the force at the impact zone Z is far greater and the resulting pressure wave proceeds much faster. The pressure wave (and cellular cascade) reach the outer boundary (and therefore the skin 12) much more quickly or near instantly from the time of impact.

The result is an internal pressure wave that occurs at much higher pressure and that rebounds with much greater speed resulting in much faster internal equilibrium at higher pressure. In addition, individual cells are compressed and pressurized faster than they can relieve pressure by emptying into adjacent cells. The foam substrate can be non-destructively compressed only as far as the internal cell structure can withstand the concomitantly increasing pressure of the compressed gas within the cellular volume. After the cell structure's pressure limit has been reached, further compression of the foam requires destructive deformation of the cellular structure (bursting the foam cells) similar to conventional rigid closed cell foams, except that in the flexible and semi-rigid foams used in the invention, these burst cells can still recover their original shape. The sum of the above pressure effects is to make the foam substrate 13 very rigid during a high-speed impact, and as such, the protective layer 10 behaves similarly to EPS during a high speed impact, actually crushing to absorb and dissipate impact energy. But unlike conventional EPS, the protective layer 10 can recover to its original shape.

In sum, the protective layer 10 according to the invention behaves essentially as a flexible foam at low impact speeds, non-destructively deforming to cushion and protect an underlying body part from injury while retaining some rigidity at low speeds. Whereas at high impact speeds the protective layer 10 behaves essentially as a conventional rigid EPS foam, absorbing impact energy by destructive deformation. However, unlike conventional rigid EPS, the flexible and semi-rigid foams of the invention retain the ability to recover their shape, or a substantial proportion (preferably at least 50, preferably 60, preferably 70, preferably 80, preferably 90, preferably 92, preferably 94, preferably 96, preferably 98, percent) thereof, even after a high speed destructive impact. It can be seen that the invented protective layer 10 is superior to protective foam layers known in the art such as EPS foam layers, because protective layer 10 provides adequate impact protection to an underlying body part for a wider range of impact speeds, and because unlike conventional EPS foams which must be discarded after a high speed destructive impact, the protective layer 10 can be reused because it recovers its original shape.

In a further preferred embodiment, the formed skin 12 is provided with vent holes 14 through the skin 12 at strategic locations to provide a protective layer 10 with a manipulated degree of rigidity. As explained above, the pressure wave P is permitted to completely escape the foam substrate 13 in the absence of the skin 12, and is substantially contained within the substrate 13 when enclosed by the skin 12. It will be further understood that placing vent holes 14 at specific locations or zones permits compressed gas to escape at these locations at a rate that is proportional to the open area of the vent holes 14 through the skin 12. In such vented zones, the proportion of the initial pressure wave that is redirected back into the foam substrate is reduced in an amount that is based on the rate at which compressed air is permitted to escape through the vent holes 14. More simply, the overall result of providing vent holes 14 is that the magnitude of the rebounding pressure wave P is diminished, and the protective layer 10 exhibits a lesser degree of rigidity in vented zones where compressed gas is vented from the foam substrate 13 during an impact. It will be understood that the degree to which the pressure wave P is thus diminished, and therefore the magnitude of diminished rigidity, can be regulated by controlling the total open area through the formed skin 12 resulting from vent holes 14 in a particular vented zone. Specifically, the local rigidity of the protective layer 10 adjacent a vented zone can be only slightly diminished by providing very small and/or highly spaced vent holes (small open area), or the local rigidity can be substantially diminished by providing larger and/or more closely spaced vent holes (large open area). By providing a plurality of different vented zones, one can provide a single, seamless protective layer 10 having two or more separate zones exhibiting different or nonequivalent local rigidity.

Figure 5:
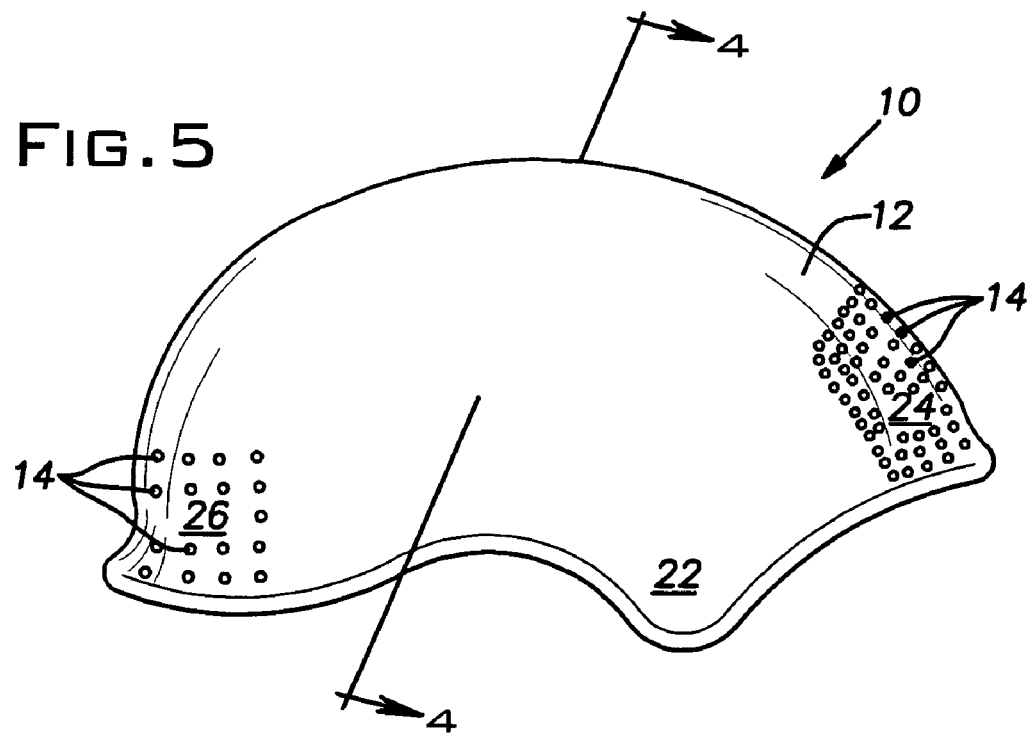
FIG. 5 is a perspective view of the protective layer from FIG. 4, shown without the helmet shell.

Referring to FIGS. 4-5, a protective layer 10 according to the invention adapted for a bicycle or sports helmet 20 has a plurality of protective zones. Each zone has its rigidity tailored to the particular portion of the head that it must protect. It is known, for example, that the temples and base of the skull are very susceptible to impact injury, while the forehead is less so due to its greater thickness. In FIG. 5 the temple zones 22 are provided with few or no vent holes in the skin 12 while the frontal zone 24 and occipital zone 26 are provided with vent holes. Further, because the occipital zone of the skull is more fragile than the frontal zone and less fragile than the temple zones, occipital protective zone 26 has fewer vent holes than the frontal zone 24 but more than the temple zones 22. The above configuration is shown only by way of example, but it can be seen that the invented protective layer 10 provides a single, seamless and fully continuous protective layer that can be adjusted in different zones to provide different degrees of rigidity depending on the susceptibility of the underlying portion of the body (e.g. skull) being protected.

This represents a significant improvement over the prior art. For example, prior helmets using a single seamless protective layer (such as EPS) are very rigid and non-energy absorbent for low-speed impacts across the entire surface thereof. While such rigidity might be acceptable for the frontal portion of one's head, high rigidity at the sides and temples during a low-speed impact can actually cause injury instead of preventing it.

Conversely, a protective layer having a foam substrate 13 made from semi-rigid or flexible foam enclosed by a formed skin 12 as described herein can be provided having side or temple zones 22 of high energy absorption (necessary to protect the temples and sides of one's head during low-speed impacts), while the energy absorption in the frontal zone 24 may be manipulated by placement of a number of vent holes 14 to create a tailored energy absorptive cushion to prevent frontal injury during low-speed impacts. This plurality of protective zones having different degrees of rigidity is provided according to the invention by a seamless protective layer 10 instead of by multiple protective layers having different degrees of rigidity that must be joined together or otherwise meet at a seam. The absence of a seam virtually eliminates the risk of accidental injury due to failure or separation of adjacent protective layers during an impact. Also, the unitary construction of the seamless protective layer 10 described herein greatly simplifies the manufacture of protective equipment embodying the impact absorbing protective layer 10; i.e. helmets, elbow pads, knee pads, chin guards, forearm guards, shin guards, chest plates, body armor, etc.

In addition to the advantages described above, the formed skin 12, particularly when made from thermoplastic polyurethane film, provides excellent abrasion resistance and durability compared to the outer surface of the foam substrate alone. This is due in part to the film's superior elasticity and shear strength.

It should be noted that the invented protective layer 10 can be used in virtually any type device where it is desired to protect a human or animal occupant or participant from impact-related injury. Such devices include, but are not limited to, automobile components including doors, dashboards and seats, motorcycle helmets, bicycle helmets, skateboard helmets, elbow and knee pads, other sport helmets (e.g. for football, baseball, hockey, etc.), geriatric protection equipment such as hip pads, etc. Alternatively, the protective layer 10 can be used to cushion impacts for inanimate objects, e.g. impacting machinery, packaging materials, etc.

In the above description, the foam layer 13 is disclosed as being an open-celled polyurethane foam. Alternatively, and according to a further preferred embodiment of the invention, the foam substrate 13 is made from a viscoelastic polyurethane foam having a density of about 104 kg/m$^3$, less preferably ±5, 10, 15, 20, 25 or 30 percent. In flexible and semi-rigid foams having a substantial proportion of open cells the pressure wave and cellular cascade described above will proceed substantially as described above through the open cell network. In a partially open-cell, partially closed-cell viscoelastic foam, the open cell structure provides many of the benefits described above while the closed cell structure and the molecular morphology provide an effective minimum rigidity which cannot be diminished because these cells cannot exhaust pressurized gas except by destructive deformation via bursting of the closed cell s. As a result, the above-described cellular cascade is permitted to proceed until compression of the foam substrate reaches a transition threshold, beyond which further compression requires bursting the closed cells. Beyond this threshold, the protective layer 10 transitions from behaving as a semi-rigid foam as described above, to behaving substantially as a rigid, but recoverable, closed-cell foam that is effective to abate high-speed impact forces. Below this threshold, the protective layer provides adequate cushioning to protect against low-speed impact force injury.

The preferred polymeric viscoelastic foam is Zorbium foam from Team Wendy, LLC. Other polymeric viscoelastic foams such as: SunMate brand foam from Dynamic Systems Inc., (Leicester, N.C.) preferably "extra firm", less preferably "firm" or "T50E"; Confor brand foam. Confor 47 foam can be used; it has a density of 92.8 kg/m$^3$. Confor 45 and Confor 42 foams can also be used. Confor foams have mainly closed cells but with some open cells. These foams are available from E-A-R Specialty Composites, a division of Cabot Safety Corporation, Tempur brand foam (preferably the stiffer grades) available from Fagerdala World Foams of Sweden can also be used. Other similar foams known in the art may be used, such as those described in Cellular Polymers, Vol. 18, No. 2 (1999) pp. 117-136, and those from Dow Chemical Co. and Bayer Corporation. The higher the percentage of closed cells, the stiffer the foam and the more quickly the transition threshold is reached.

Although the herein above described embodiments of the invention constitute preferred embodiments, it should be understood that modifications can be made thereto without departing from the scope of the invention as set forth in the appended claims.

What is claimed is:

1. A protective layer comprising a viscoelastic foam substrate and a flexible skin at least partially enclosing said foam substrate, said flexible skin having a plurality of vent holes provided therein in a protective zone of said flexible skin overlying said foam substrate, said vent holes providing fluid communication between the ambient environment and a portion of the surface of said foam substrate that underlies said protective zone, said flexible skin being a barrier to exhaustion of gas pressure from within said foam substrate to the ambient atmosphere on impact of said foam substrate, said plurality of vent holes being effective to regulate the local rigidity of said protective layer by permitting gas to escape at said protective zone at a rate that is dependent on the number and size of said vent holes through said flexible skin in said protective zone, wherein said viscoelastic foam substrate is a continuous foam layer in the vicinity under said vent holes.

2. A protective layer according to claim 1, said skin being formed integrally with said foam substrate.

3. A protective layer according to claim 1, said skin being separately provided from said foam substrate and being subsequently molded thereto.

4. A protective layer according to claim 1, said foam substrate comprising flexible polyurethane foam, said skin comprising a formable thermoplastic.

5. A protective layer according to claim 1, said skin having a first protective zone and a second protective zone, each said protective zone of said skin having a plurality of vent holes provided therein effective to regulate the rigidity of said protective layer adjacent said protective zone, said protective layer being more rigid adjacent said first protective zone than adjacent said second protective zone by virtue of the relative size and/or density of vent holes provided in said first protective zone compared to in said second protective zone.

6. A protective layer according to claim 5, said protective layer being a seamless protective layer across both said first and said second protective zones.

7. A protective layer according to claim 1, said foam substrate having a density of 104 kg/m$^3$+/−30%.

8. A protective layer according to claim 1, said foam substrate comprising a partially closed-cell polymeric foam.

9. A protective layer according to claim 1, said protective layer being a seamless protective layer and having a first protective zone and a second protective zone, said protective layer being more rigid adjacent said first protective zone than adjacent said second protective zone, said foam substrate being seamless in the region of said first and said second protective zones.

10. A protective layer according to claim 1, said skin having a porosity at least 10% lower than an outer surface of said foam substrate.

11. A protective layer according to claim 1, said foam substrate being effective to recover to a substantial proportion of its original shape following deformation thereof resulting from an impact to said protective layer.

12. A protective layer according to claim 1, said foam substrate being effective to recover to at least 90% its original shape following deformation thereof from a high speed impact.

13. A protective layer according to claim 1, wherein said protective layer exhibits energy absorptive properties of a flexible or semi-rigid foam at impact speeds less than 5 mph thereby being effective to absorb impact energy through non-destructive, recoverable deformation of the foam substrate, and wherein said protective layer exhibits energy absorptive properties of a rigid foam at impact speeds greater than 15 mph thereby being effective to dissipate and absorb impact energy through deformation of the foam substrate.

14. A protective layer according to claim 13, said foam substrate being effective to recover to a substantial proportion of its original shape following deformation thereof resulting from an impact to said protective layer at a speed of greater than 15 mph.

15. A protective layer according to claim 14, said foam substrate being effective to recover to at least 90% its original shape following said deformation thereof.

16. A protective layer according to claim 13, said skin having a first protective zone and a second protective zone, each said protective zone of said skin having a plurality of vent holes provided therein effective to regulate the local rigidity of said protective layer adjacent said protective zone.

17. A protective layer according to claim 16, said protective layer being more rigid adjacent said first protective zone than adjacent said second protective zone.

18. A protective layer according to claim 13, said foam substrate being seamless in the region of said first and said second protective zones, said protective layer being more rigid adjacent said first protective zone than adjacent said second protective zone.

19. A protective layer according to claim 1, wherein said plurality of vent holes are provided as an array of vent holes located in said protective zone.

20. A protective layer according to claim 1, further comprising a hard outer shell disposed adjacent said skin opposite said foam substrate.

21. A protective layer according to claim 1, said viscoelastic foam substrate being seamless.

* * * * *